United States Patent
Chapman et al.

(10) Patent No.: US 7,701,951 B2
(45) Date of Patent: Apr. 20, 2010

(54) RESOURCE RESERVATION AND ADMISSION CONTROL FOR IP NETWORK

(75) Inventors: John T. Chapman, Saratoga, CA (US); Xiaomei Liu, San Jose, CA (US); Harsh Parandekar, San Jose, CA (US); Satish Bommareddy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 11/370,141

(22) Filed: Mar. 6, 2006

(65) Prior Publication Data

US 2007/0206607 A1   Sep. 6, 2007

(51) Int. Cl.
    *H04L 12/28* (2006.01)
(52) U.S. Cl. .................. 370/395.52; 370/230; 370/401; 725/95; 725/111; 725/117
(58) Field of Classification Search .................. 370/230, 370/392, 395.52, 395.53, 486, 220, 401, 370/467; 725/111, 109, 95, 117, 118
See application file for complete search history.

(56) References Cited

U.S. PATENT DOCUMENTS

| | | | |
|---|---|---|---|
| 4,977,593 | A | 12/1990 | Balance |
| 5,153,763 | A | 10/1992 | Pidgeon |
| 5,604,735 | A | 2/1997 | Levinson et al. |
| 5,724,510 | A | 3/1998 | Arndt et al. |
| 5,784,597 | A | 7/1998 | Chiu et al. |
| 5,805,602 | A | 9/1998 | Cloutier et al. |
| 5,918,019 | A | 6/1999 | Valencia |
| 5,931,954 | A | 8/1999 | Hoshina et al. |
| 5,933,420 | A | 8/1999 | Jaszewski et al. |
| 5,963,556 | A * | 10/1999 | Varghese et al. ............ 370/401 |
| 5,963,557 | A | 10/1999 | Eng |

(Continued)

FOREIGN PATENT DOCUMENTS

| | | |
|---|---|---|
| WO | 00/72509 | 11/2000 |
| WO | 2005117310 | 12/2005 |
| WO | 2005117358 | 12/2005 |

OTHER PUBLICATIONS

Christian Vogt et al, Admission Control and Resource Reservation on the Internet, 2002, ACM.*

(Continued)

*Primary Examiner*—Aung S Moe
*Assistant Examiner*—Vinncelas Louis
(74) *Attorney, Agent, or Firm*—Stolowitz Ford Cowger LLP

(57) ABSTRACT

A resource reservation and admission control scheme uses pseudowires to reserve bandwidth over a layer-2 and/or layer-3 network. The pseudowires are associated with ports on different network processing devices. During a resource reservation and admission control session, the physical links used by the pseudowire are selected and reserved to more effectively allocate network bandwidth. The negotiated pseudowire is then used to transport content for a communication session over the network. In one example application, the resource reservation and admission control scheme is used during a Downstream External PHY Interface (DEPI) session for pseudowires established between a Modular Cable Modem Termination System (M-CMTS) Core and an Edge Quadrature Amplitude Modulation Interface (EQAM) device. However, the reservation protocol can be used in any application that needs to reserve bandwidth over an Internet Protocol (IP) network.

13 Claims, 7 Drawing Sheets

U.S. PATENT DOCUMENTS

| | | | |
|---|---|---|---|
| 6,023,769 A | 2/2000 | Gonzalez | |
| 6,078,595 A | 6/2000 | Jones et al. | |
| 6,101,180 A | 8/2000 | Donahue et al. | |
| 6,137,793 A | 10/2000 | Gorman et al. | |
| 6,233,246 B1 | 5/2001 | Hareski et al. | |
| 6,275,990 B1 | 8/2001 | Dapper et al. | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 | 2/2004 | Daruwalla et al. | |
| 6,697,970 B1 | 2/2004 | Chisolm | |
| 6,698,022 B1 | 2/2004 | Wu | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,819,682 B1 | 11/2004 | Rabenko et al. | |
| 6,847,635 B1 | 1/2005 | Beser | |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,950,399 B1 | 9/2005 | Bushmitch et al. | |
| 6,959,042 B1 | 10/2005 | Liu et al. | |
| 6,993,016 B1 | 1/2006 | Liva et al. | |
| 6,996,129 B2 | 2/2006 | Krause et al. | |
| 7,007,296 B2 | 2/2006 | Rakib et al. | |
| 7,023,882 B2 | 4/2006 | Woodward, Jr. et al. | |
| 7,039,049 B1 | 5/2006 | Akgun et al. | |
| 7,065,779 B1 | 6/2006 | Crocker et al. | |
| 7,067,734 B2 | 6/2006 | Abe et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,177,921 B2 * | 2/2007 | Taguchi | 709/220 |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,305,460 B2 | 12/2007 | Park | |
| 7,359,332 B2 | 4/2008 | Kolze et al. | |
| 7,363,629 B2 | 4/2008 | Springer et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0052927 A1 | 5/2002 | Park | |
| 2002/0066110 A1 * | 5/2002 | Cloonan et al. | 725/111 |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0129378 A1 * | 9/2002 | Cloonan et al. | 725/111 |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0058794 A1 | 3/2003 | Pantelias et al. | |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0214943 A1 | 11/2003 | Engstrom et al. | |
| 2003/0214982 A1 | 11/2003 | Lorek et al. | |
| 2004/0017816 A1 * | 1/2004 | Ishwar et al. | 370/395.53 |
| 2004/0039466 A1 | 2/2004 | Lilly et al. | |
| 2004/0045037 A1 | 3/2004 | Cummings et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0156313 A1 * | 8/2004 | Hofmeister et al. | 370/229 |
| 2004/0160945 A1 | 8/2004 | Dong et al. | |
| 2004/0163129 A1 | 8/2004 | Chapman et al. | |
| 2004/0181800 A1 | 9/2004 | Rakib et al. | |
| 2004/0244043 A1 | 12/2004 | Lind et al. | |
| 2004/0248530 A1 | 12/2004 | Rakib et al. | |
| 2005/0018697 A1 | 1/2005 | Enns et al. | |
| 2005/0122676 A1 | 6/2005 | Poli et al. | |
| 2005/0123001 A1 * | 6/2005 | Craven et al. | 370/486 |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0220014 A1 * | 10/2005 | DelRegno et al. | 370/230 |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0286558 A1 * | 12/2005 | Ould-Brahim et al. | 370/467 |
| 2005/0289623 A1 | 12/2005 | Midani et al. | |
| 2006/0002294 A1 | 1/2006 | Chapman et al. | |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2006/0251074 A1 * | 11/2006 | Solomon | 370/392 |
| 2007/0008982 A1 * | 1/2007 | Voit et al. | 370/401 |
| 2007/0274345 A1 | 11/2007 | Taylor et al. | |
| 2008/0037545 A1 | 2/2008 | Lansing et al. | |

OTHER PUBLICATIONS

Ben Bekele et al, Downstream External PHY Interface Specification, Aug. 2005.*
Chapman et al, CM-SP-DEPI-W03-050302,Feb. 8, 2005, Cablelabs.*
Chapman et al, CM-SP-DEPI-I01-050805,Aug. 5, 2005, Cablelabs.*
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC 3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service—Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs—Research, pp. 1-13.

Adoba, et al., Extensible Authentication Protocol (EAP), RFC 3748, Jun. 2004, pp. 1-64, Standards Track.

ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.

Cable Television Laboratories, Inc., Data-Over-Cable Service Interface Specifications Modular CMTS Downstream External PHY Interface Specification, CM-SP-DEPI-I04-061222, Dec. 22, 2006, pp. 1-74.

Data Over Cable Service Interface Specification, Aug. 4, 1997.

Ethereal: Display Filter Reference: DOCSIS Upstream Channel Descriptor, Webarchivedate Apr. 27, 2004.

DOCSIS Set Top Gateway (DSG) interface specification, Feb. 28, 2002.

An Overview of Internet Protocols, Dann, Jan. 1998.

Patrick, M.; RFC3046-DHCP Rely Agent Information Option; The Internet Society (2001) http://www.faqs.org/rfcs/rfc3046.html; Jan. 2001; 11 pages.

Cable Television Laboratories, Inc., Interim Specification, Data-Over-Cable Service Interface Specifications, Radio Frequency Specification, SP-RFIv1.1-I02-990731, Jul. 30, 1999, 353 pages.

Cable Television Laboratories, Inc., Interim Specification, Data-Over-Cable Service Interface Specifications, Radio Frequency Interface Specification, SP-RFIv1.1-I04-000407, Apr. 7, 2000, 376 pages.

3COM, High-Speed Cable Internet Solutions, http://www.3com.com/cablenow/pdf/7125dsht.pdf, Dec. 1999, 4 pages.

Phuc H. Tran, USPTO Office Action Paper No. 20080427, May 1, 2008, 10 pages.

U.S. Appl. No. 11/292,725, Bernstein et al., "Advanced Multicast Support for Cable", filed Dec. 1, 2005.

Thompson, et al. IPv6 Stateless Address Autoconfiguration, RFC 2462, Dec. 1998, pp. 1-24, Network Working Group.

Thompson, et al. IPv6 Stateless Address Autoconfiguration, RFC 4862, Sep. 2007, pp. 1-29, Network Working Group.

Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.

* cited by examiner

US 7,701,951 B2

RESOURCE RESERVATION AND ADMISSION CONTROL FOR IP NETWORK

BACKGROUND

A new Modular Cable Modem Termination System (M-CMTS) architecture has been developed for the Data Over Cable Service Interface Specification (DOCSIS) environment that is described in co-pending application Ser. No. 11/134,818, filed May 20, 2005, entitled "TIMING SYSTEM FOR MODULAR CABLE MODEM TERMINATION SYSTEM" which is herein incorporated by reference.

One characteristic of the Modular CMTS architecture is that the DOCSIS Media Access Control (MAC) and Physical Interface (PHY) are located in different chassis and connected together through any type of packet switched network, such as a Gigabit Ethernet (GE), 10GE, or Multi-Protocol Label Switching (MPLS). In one embodiment, the DOCSIS MAC is located in the M-CMTS Core and the PHY is located in an Edge Quadrature Amplitude Modulation (EQAM) device. The interface in the downstream direction between the M-CMTS Core and the EQAM device is referred to as the Downstream External PHY Interface (DEPI), and as described above, may be established over a Gigabit Ethernet network or some other type of packet switched Internet Protocol (IP) network.

The intervening GE network between the MAC and PHY is alternatively referred to as a Converged Interconnect Network (CIN) and typically comprises one or more Layer-2 (L2) bridges and/or Layer-3 (L3) routers. In the M-CMTS architecture, multiple different Ethernet connections may be connected over the CIN between one or more M-CMTS Cores and one or more EQAM devices.

Bridging and routing protocols try and choose the best links on intermediate hops between these different layer-2 and layer-3 switching devices. This can result in the over subscription of some links and the under subscription of other links. For example, the intermediate CIN network may have a small number of source and destination MAC addresses that may not evenly distribute traffic due to hashing on the limited number of MAC addresses. Similar uneven load distribution may be created by layer-3 load balancing algorithms. In either case, bandwidth capability in the CIN can be negatively impacted by the packet switching devices between the M-CMTS Core and the EQAM device.

The present invention addresses this and other problems associated with the prior art.

SUMMARY OF THE INVENTION

A resource reservation and admission control scheme uses pseudowires to reserve bandwidth over a layer-2 and/or layer-3 network. The pseudowires are associated with ports on different network processing devices. During a resource reservation and admission control session, the physical links used by the pseudowire are selected and reserved to more effectively allocate network bandwidth. The negotiated pseudowire is then used to transport content for a communication session over the network. In one example application, the resource reservation and admission control scheme is used during a Downstream External PHY Interface (DEPI) session for pseudowires established between a Modular Cable Modem Termination System (M-CMTS) Core and an Edge Quadrature Amplitude Modulation Interface (EQAM) device. However, the reservation protocol can be used in any application that needs to reserve bandwidth over an Internet Protocol (IP) network.

The foregoing and other objects, features and advantages of the invention will become more readily apparent from the following detailed description of a preferred embodiment of the invention which proceeds with reference to the accompanying drawings.

DETAILED DESCRIPTION

Figure 1:
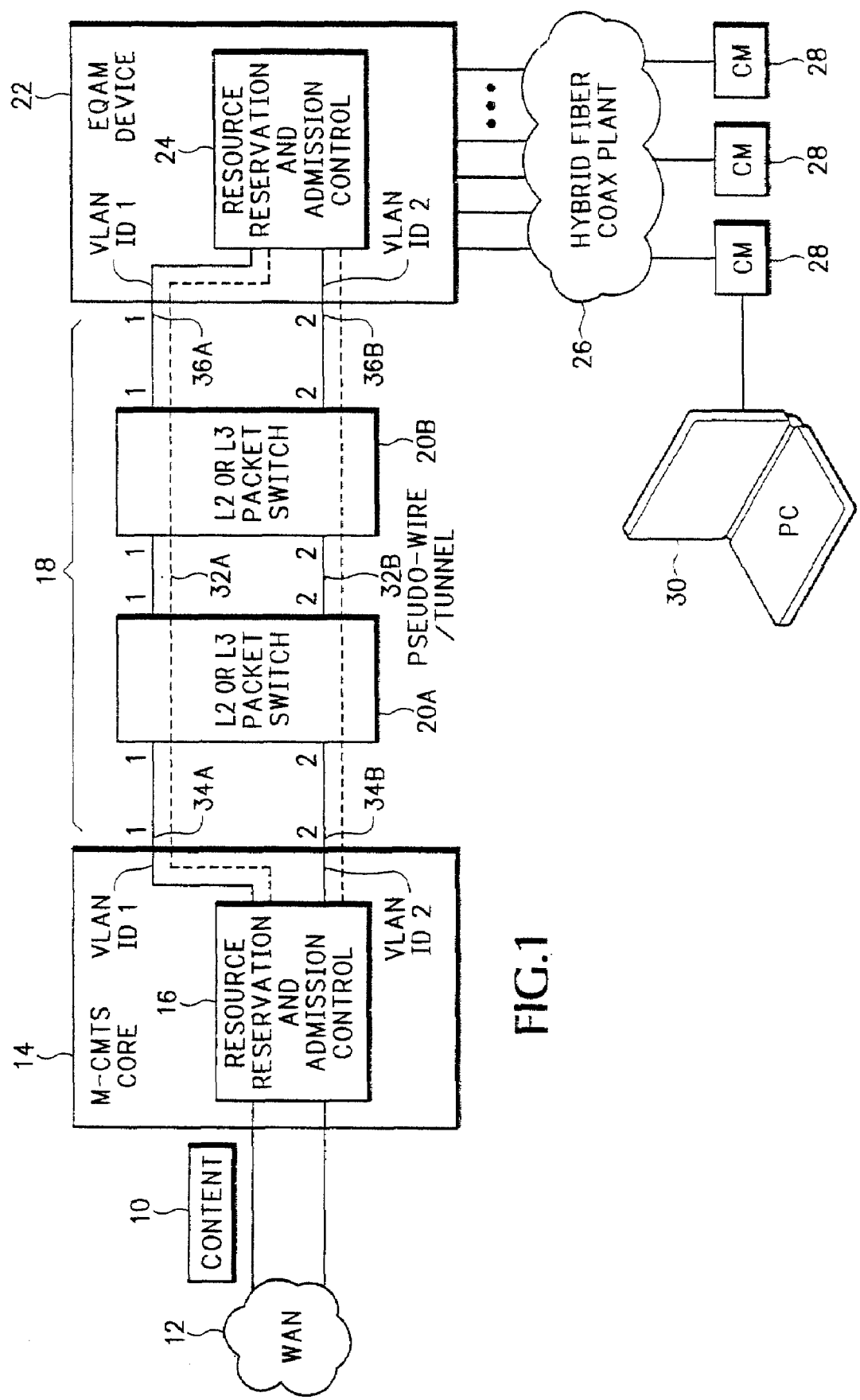
FIG. 1 is a block diagram of a cable modem system that uses a resource reservation and admission control scheme.

Referring to FIG. 1, a Modular CMTS Core 14 is connected to a Wide Area Network (WAN) 12 and to one or more Edge Quadrature Amplitude Modulation Interface (EQAM) devices 22 through an Internet Protocol (IP) network 18. In one embodiment, the IP network 18 may include one or more Layer-2 and/or Layer-3 packet switching devices 20A and/or 20B. The EQAM device 22 is connected to a Hybrid Fiber Coaxial (HFC) cable plant 26 that is used for communicating to multiple Cable Modems (CMs) 28. The CMs 28 are connected to any type of equipment that may need to transmit or receive DOCSIS IP data. For example, a Personal Computer (PC) 30, Set-Top Box (STB), television, IP phone, or any other type of IP endpoint or customer premise equipment.

Resource Reservation

A resource reservation and admission control scheme is performed by a controller 16 in the M-CMTS Core 14 and a controller 24 in the EQAM device 22. The controllers 16 and 24 set-up pseudowires 32 over the IP network 18. The pseudowires 32 are alternatively referred to as tunnels or virtual connections and are used by the controllers 16 and 24 to more effectively reserve and distribute bandwidth over the IP network 18. In one embodiment, the pseudowires (PW) 32 set up a logical connection between two end points. When the PW is set up, it is then associated with a Layer-2 (L2) tag, such as a Virtual Local Area Network (VLAN) tag. The VLAN tags are reserved and allocated and then used in packets for a particular communication session between the M-CMTS Core 14 and EQAM device 22.

Some VLAN tables are configured for some or all of the egress ports 34 and/or ingress ports 36 in the M-CMTS Core 14 and EQAM device 22, respectively. The VLAN tables associate one or more VLAN tags with each port. The VLAN table can also identify the bandwidth configuration of the port. For example, some ports may be 1 GE ports and some may be 10GE ports. In another embodiment, an egress port 34 may be associated with one or more VLAN tags while the ingress port 36 may accept any VLAN tag.

The controllers 16 and 24 in the M-CMTS Core 14 and EQAM device 22, respectively, negotiate which VLAN tags are used for a particular communication session. The selected VLAN tag is associated with ports having sufficient available bandwidth for transporting content 10 from WAN 12 over IP network 18.

The EQAM device 22 and the M-CMTS Core 14 can select which physical link to place a PW 32 onto and have it stay there. Since the max bandwidth of each PW 32 is known and the bandwidth of the physical links are known, the PW 32 can be admitted based upon available bandwidth (admission control) and then directly associated with a physical link (resource reservation).

The pseudowires 32 established over the IP network 18 use the negotiated VLAN tag to direct packets out particular egress ports 34 in M-CMTS Core 14 and into particular ingress ports 36 in EQAM device 22. Because bandwidth for these ports is reserved, bandwidth utilization is more effectively controlled over particular physical links in the IP network 18.

In one embodiment, the IP network 18 is a Gigabit Ethernet (GE) network and the egress ports 34 on the M-CMTS Core 14 and the ingress ports 36 in the EQAM device 22 are GE ports that may each contain one or more VLAN IDs. For example, GE egress port 34A and GE ingress port 36A may each be associated with one or more of the same VLAN ID values. Similarly, GE egress port 34B and GE ingress port 36B may both be associated with one or more of the same VLAN ID values. Of course, different egress ports 34 or ingress ports 36 can be assigned to different combinations of VLAN ID values.

The VLANs may connect between any combinations of physical ports (34A to 36A or 34A to 36B) since the intervening switches 20A and 20B can provide the desired connectivity. For example, the ports in FIG. 1 may have the following VLAN ID associations:

Port 34A: VLAN ID 1, VLAN ID 3;
Port 34B: VLAN ID 2, VLAN ID 4;
Port 36A: VLAN ID 1, VLAN ID 4; and
Port 36B: VLAN ID 2, VLAN ID 3.

A virtual connection between port 34A and 36A may be associated with VLAN ID 1 or between port 34A and port 36B with VLAN ID 3 depending on bandwidth availability. Similarly, a virtual connection between port 34B and 36A may be associated with VLAN ID 4 or between port 34B and port 36B with VLAN ID 2. Further, VLAN ID values associated with other M-CMTS Cores can also be associated with either ports 36A and 36B and VLAN IDs associated with other EQAM devices may be associated with port 34A and 34B.

In an alternative embodiment, Ethernet addresses associated with the different ports 34 and 36 may be used to assign different ports to different communication sessions. In yet another embodiment, Multi-Protocol Label Switching (MPLS) tags can be used to reserve ports on the M-CMTS Cores 14 and the EQAM devices 22.

The pseudowires 32 can be viewed by the controllers 16 and 24 as variable bit rate connections with a maximum burst rate placed on a physical link in the CIN 18 between the MCMTS 14 and the EQAM 22. The controllers 16 and 24 then use the resource reservation protocol described below to decide which physical links (physical ports) to place the pseudowires 32.

As an example, the pseudowires 32 may have a maximum burst rate of around 40 Million bits per second (Mbps) and 24 of these pseudowires could be built into a same physical GE connection. There may be multiple MAC framers, QAM channels (PHYs), and physical GE connections in the communication system (see FIG. 2). The controllers 16 and 24 use the resource reservation protocol to efficiently pack each physical connection with the maximum number of logical pseudowire connections 32. For example, as mentioned above, the EQAM device 22 may have one ingress port 36 for every 24 QAM output channels. Accordingly, the controllers 16 and 24 may establish 24 logical pseudowires 32 over each ingress port 36.

The resource reservation can be used for any system that needs to allocate ports on a common subnet as further described below in FIG. 7. For example, the resource reservation and admission control scheme can be used as an extension to DEPI, RSVP, or any other resource reservation protocol that needs to establish pseudowires, tunnels, or virtual connections across a layer-2 and/or layer-3 IP. The resource reservation system can also be used with multiple different subnets by configuring the L-2 and L-3 packet switches in the different subnets to conduct the same resource reservation operation conducted by the M-CMTS Core 14 and EQAM device 22.

Figure 2:
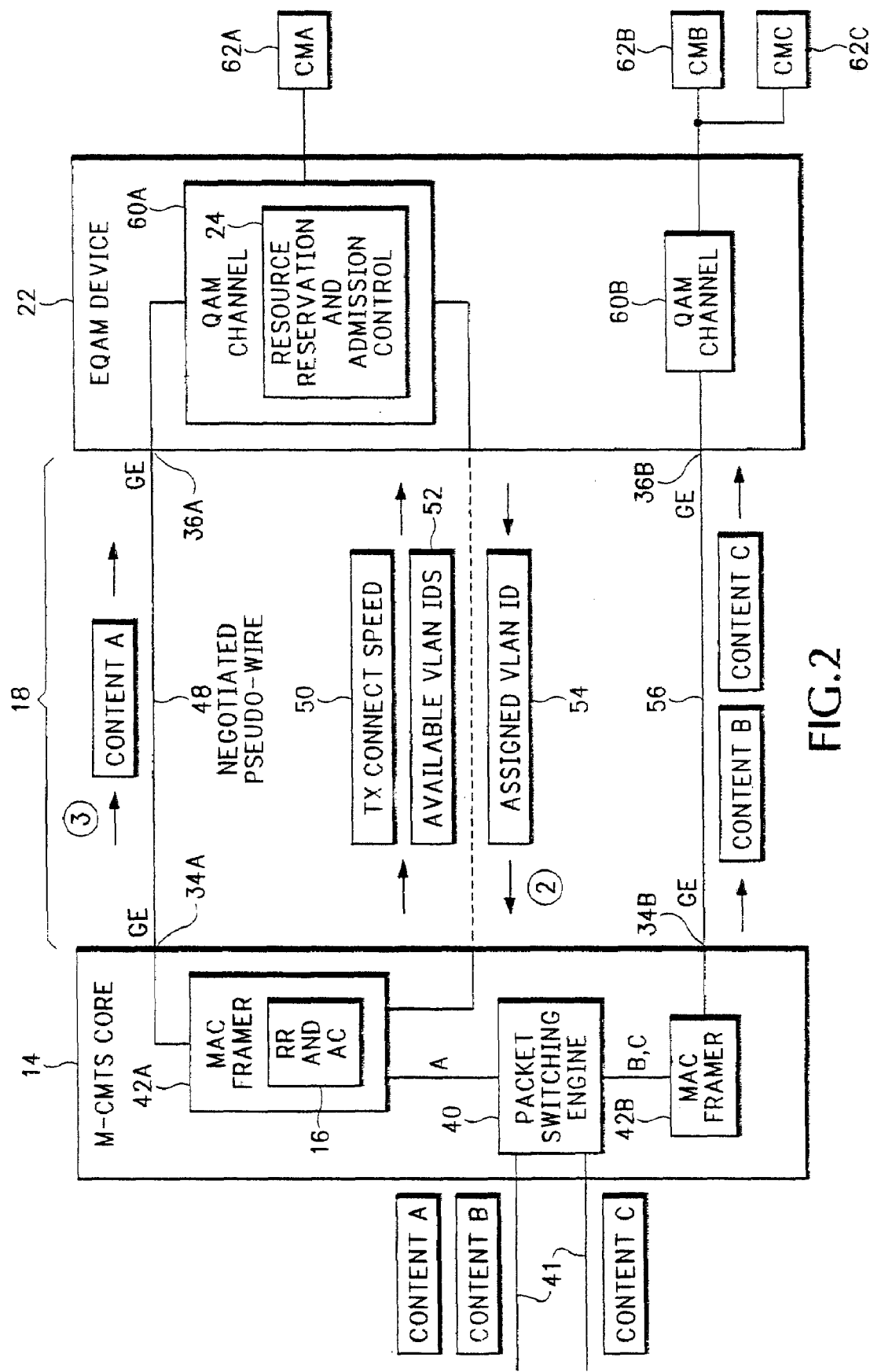
FIG. 2 is a more detailed diagram of the cable modem system described in FIG. 1.

FIG. 2 shows the system in FIG. 1 in more detail. The M-CMTS Core 14 includes a packet switching engine 40 that receives different content A, B and C over the same or different WAN connections 41. The content A, B, and C are contained in IP packets that are directed to different associated cable modems 62A, 62B, and 62C, respectively.

The packet switching engine 40 forwards the packets for content A, B, and C to different MAC framers 42 associated with the QAM channels 60 for the associated destination cable modems 62. For example, the content A is directed to a MAC framer 42A that communicates with CM 62A via a QAM channel 60A. The content B and C is directed to a MAC framer 42B that communicates with CMs 62B and 62C via a QAM channel 60B. The MAC framers 42 in this example operate as resource reservation and admission controllers 16 and the QAM channels 60 operate as the controllers 24 previously shown in FIG. 1. In one embodiment, the MAC framers 42 and the QAM channels 60 include processors that are programmed to perform the resource reservation and admission control scheme.

The VLAN IDs for separate different M-CMTS Cores 14 and separate MAC framers 42 are permitted to converge on a single ingress port in the EQAM device 22 (the PHY box). The converse is also true. One M-CMTS Core 14 can have a single GE port 34 with 2 VLAN IDs that cross the network 18 with each VLAN ID terminating on a different EQAM device 22. The association of VLAN IDs and GE ports can be configured by a network administrator.

Figure 3:
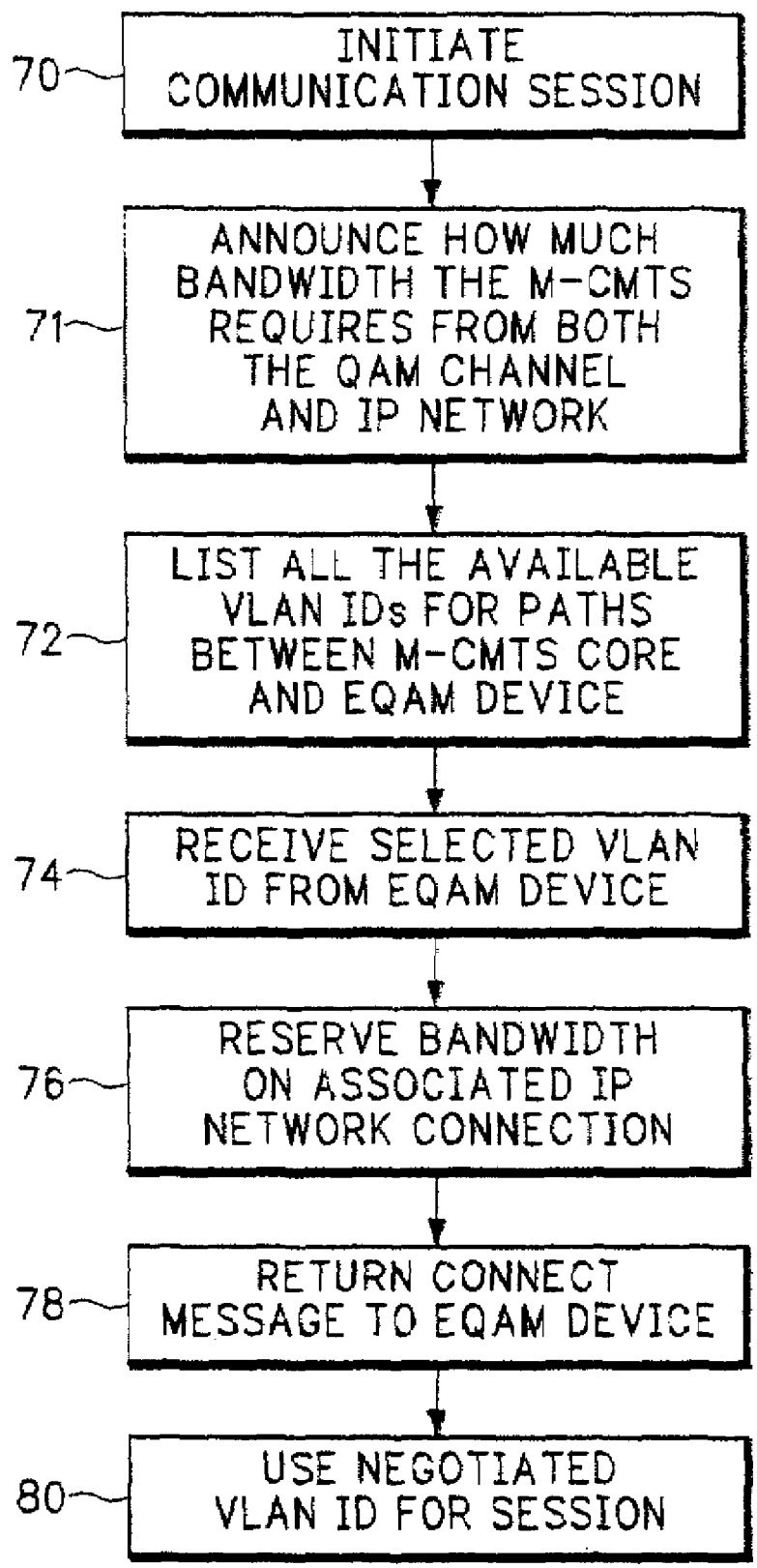
FIG. 3 is a flow diagram describing the operation of a resource reservation controller located in a Modular CMTS (M-CMTS) Core.
Figure 4:
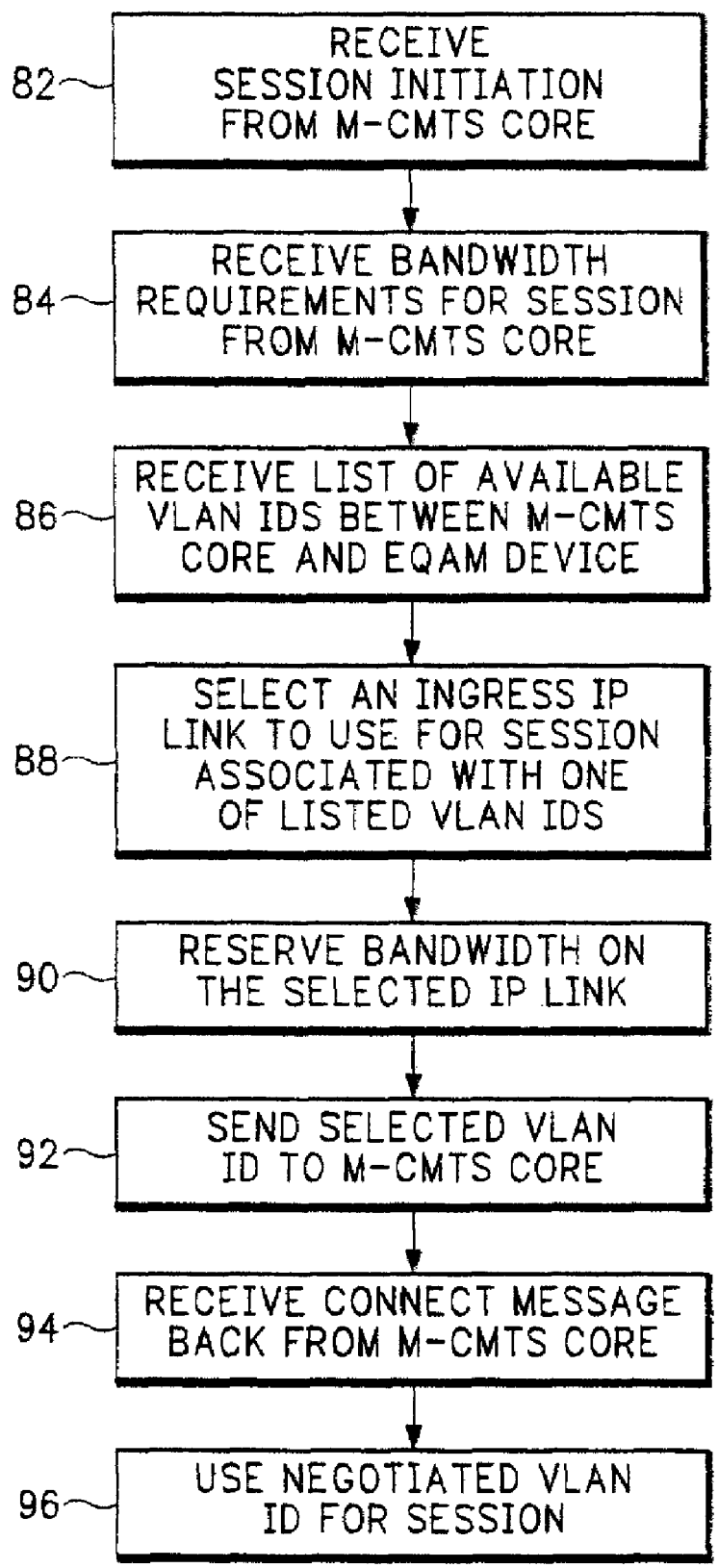
FIG. 4 is a flow diagram describing the operation of a resource reservation controller located in a Quadrature Amplitude Modulation (QAM) device.

FIGS. 3 and 4 in combination with FIG. 2 will be referenced to describe the resource reservation and admission control scheme in more detail. Referring first to FIG. 3, resource reservation and admission control may take place when M-CMTS Core 14 and EQAM device 22 first initiate a communication session. In one example, this may be the initiation of a communication session in operation 70 by the MAC framer 42A. Any type of communication session may kick off the resource reservation operation, such as initiation of a DEPI session in the M-CMTS environment, the initiation of a communication session between two gateways, etc.

In operation 71, the MAC framer 42A announces in message 50 how much bandwidth the M-CMTS Core 14 requires from both the QAM channel 60A and the IP network 18 for transmitting content A. In operation 72, the controller 16 lists in the same message 50, or in a different message 52, all of the VLAN IDs that can connect from the MAC framer to QAM channel 60 that also have sufficient bandwidth capacity for transmitting content A. As described above, this may comprise any VLAN IDs associated with physical egress ports 34 that have the required connectivity and available bandwidth.

A VLAN ID may simultaneously participate in multiple session negotiations. In one embodiment, the M-CMTS Core 14 may provisionally make a reservation of bandwidth for any or all of the VLAN IDs identified in message 52. This reservation can prevent bandwidth from the listed VLAN IDs from being allocated to other communication sessions while a VLAN ID is being negotiated with the QAM channel 60A. In this embodiment, after the QAM channel 60A selects one of the identified available VLAN IDs, and the selected VLAN ID is accepted, the M-CMTS Core 14 may release the bandwidth reservation for any of the non-selected VLAN IDs that were provisionally reserved.

Alternatively, the M-CMTS Core 14 may not provisionally reserve any bandwidth on any of the currently available VLAN IDs. In this embodiment, the QAM channel 60A in response message 54 selects one of the VLAN IDs from the list in message 52. If the selected VLAN ID is no longer available when message 54 is received, the M-CMTS Core 14 may send a failure message back to the QAM channel 60A indicating that bandwidth for the selected VLAN ID is no longer available. The failure message could then list a new set of currently available VLAN IDs for reselection by QAM channel 60A.

Alternatively, the M-CMTS Core 14 could make a temporary reservation on all the VLAN IDs it publishes to the EQAM device 22. When the EQAM response is received, the M-CMTS Core 14 could then release all the temporary reservations except the one selected by the EQAM device 22, which it would then make permanent.

Either way, in operation 74, the M-CMTS Core 14 receives a response 54 back from the QAM channel 60A identifying one of the VLAN IDs previously presented in message 52. Alternatively, the QAM channel 60A could send back an error message indicating none of the listed VLAN IDs are available.

When a VLAN ID is identified, the framer 42A in operation 76 reserves the bandwidth for the egress port 34A associated with the identified VLAN ID. A connect message is then sent back to the QAM 60A in operation 78. The framer 42A then uses the selected VLAN ID in packets containing content A to establish a pseudowire 48 with the QAM channel 60A.

FIG. 4 shows the operations performed by the QAM channel 60A. In one embodiment, the EQAM device 22 and QAM channels 60 can be connected to multiple different M-CMTS Cores 14. Thus, in this configuration, the EQAM device 22 is given the responsibility of selecting and arbitrating a particular VLAN ID. The QAM channel 60A in operation 82 receives session initiation messages from the M-CMTS Core 14. In operation 84, the QAM 60A receives the message 50 that identifies the bandwidth requirements for the communication session and in operation 86 receives the message 52 that contains the list of available VLAN IDs for the communication session.

In operation 88, the QAM 60A chooses one of the identified VLAN IDs associated with an ingress port 36 that has sufficient available bandwidth to handle the connect speed identified in message 50. The QAM 60A chooses the VLAN ID based upon any variety of internal criteria, such as available bandwidth that has not been reserved yet and path connectivity. For example, if the listed VLAN IDs are associated with more than one physical port, the VLAN ID associated with the port having the most available bandwidth may be selected. The QAM 60A reserves the bandwidth on the port 36A associated with the selected VLAN ID in operation 90 and then returns the selected VLAN ID to the framer 42A in operation 92.

After a connect message is received back from the framer 42A in operation 94, the negotiated VLAN ID is then associated with the pseudowire 48 that is used in operation 96 for conducting the communication session. The framer 42B may conduct a similar resource reservation and admission control operation for the pseudowires 56 used for transmitting content B and C.

Figure 5:
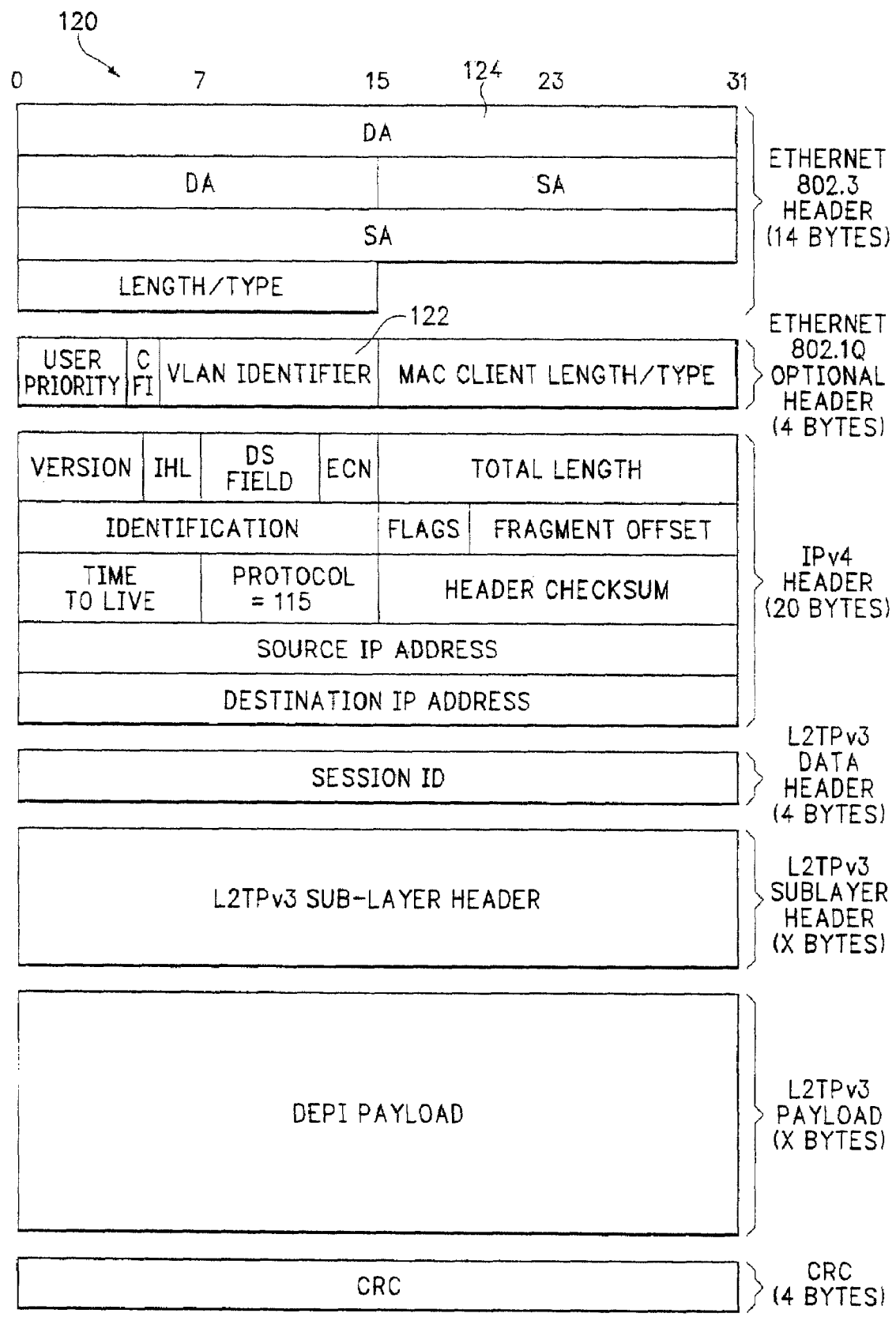
FIG. 5 is a diagram of a packet used for establishing a pseudowire across an Ethernet network between the M-CMTS Core and the EQAM device.

FIG. 5 shows an example of a packet 120 that may be sent from the M-CMTS Core 14 to the EQAM device 22. The packet 120 includes a VLAN ID field 122 that contains the VLAN ID value that is negotiated between the M-CMTS Core 14 and EQAM device 22. In one embodiment, the destination address 124 may be used instead of, or in conjunction with, the VLAN ID value to direct the packet 120 over a particular pseudowire between M-CMTS 14 Core and EQAM device 22.

In one embodiment, the M-CMTS Core 14 and the EQAM device 22 may not care what particular path is taken within network 18 for routing or switching the packet 120 from the negotiated egress port 34 to ingress port 36. Accordingly, the packet switches 20A and 20B (FIG. 1) in the CIN may not be configured with VLAN ID/port associations and the only network processing elements that are configured with VLAN ID/port associations are the M-CMTS Core 14 and the EQAM device 22. This still ensures that packets 120 for the negotiated pseudowire will be output on a previously reserved egress port 34 and input to a previously reserved ingress port 36.

Alternatively, the pseudowire may be directed through particular ports on one or more packet switches 20 in IP network 18. In this embodiment, the one or more intermediate packet switches are also configured with different VLAN ID values associated with physical ports. In this alternative embodiment, the intermediate packet switches may send reply messages back to the M-CMTS Core identifying available VLAN tags. Any common VLAN tags could then be sent to the EQAM device 22. Alternatively, the intermediate nodes may not be aware or be configured for operating this feature within the DEPI protocol. In this situation, the negotiation of VLAN tags by the intermediate packet switches could be integrated with some other existing VLAN discovery or assignment protocol such as MPLS.

Attribute Value Pairs

Any type of messaging protocol and message structure can be used for the resource reservation and admission control negotiation. As mentioned above, one application for the resource reservation scheme is for use during a Modular CMTS DEPI session. In this embodiment, the resource reservation negotiations between the M-CMTS Core 14 and the EQAM device 22 (FIGS. 1 and 2) may be conducted using Attribute Value Pairs (AVPs) during initiation of the DEPI session. One example of these AVPs are described below. Of course this is only one example and other message formats could also be used depending on the particular reservation application.

The concept of using a L3 protocol to manage physical links with L2 tags could be applied to other Layer 3 protocols, such as RSVP, and could be applied to other Layer 2 tags such as MPLS.

Transmit Connect Speed AVP

In this embodiment, the message 50 shown in FIG. 2 may be a transmit connect speed AVP. This AVP can be used in the DEPI session to indicate the maximum transmission rate of the QAM channel that will be used by the M-CMTS Core 14. If a QAM channel 60 (FIG. 2) is shared between two services, such as non-DOCSIS video and DOCSIS, this AVP could represent the bandwidth of the QAM channel being used for DOCSIS. The AVP could also reflect the DOCSIS channel being derated below 100% to prevent queue buildup from jitter.

The Tx Connect Speed may be calculated according to the maximum bit rate for MPEG-TS packets. The Tx Connect Speed can alternatively be calculated according to the maximum bit rate for DOCSIS frames. The EQAM device 22 can also account for the PHY level overhead including Forward Error Correction (FEC) and Trellis encoding if present.

Any reconfiguration change in the bandwidth rating can be communicated to each associated M-CMTS Core 14 and/or EQAM device 22. The controllers 16 and 24 in the M-CMTS Core 14 and EQAM device 22 would then automatically update the parameters used for conducting the resource reservation scheme. For example, the bandwidth rating could be changed from 98% to 96%. A connection may already be established prior to receiving an updated bandwidth rating. The current port may be overbooked as a result of the new bandwidth rating. The current session may then be torn down and then be re-established using the new rating. Alternatively, an error code may be generated.

VLAN Available IDs

A L2TPv3 Control Connection (CC) is specific to a pair of IP addresses. An IP subnet may span several physical connections in a bridged environment, such as the CIN 18 in FIG. 2. If that environment is managed with VLANs, the available VLAN ID AVP may be used for sending the available VLAN ID message 52 (FIG. 2). This allows the EQAM 22 to choose an ingress port 36 for a DEPI session by specifying one of the identified VLAN IDs. If this AVP is used, then during an Incoming Call Request message (ICRQ), the M-CMTS Core 14 supplies a list of VLAN IDs that can reach the EQAM device 22 that also have sufficient bandwidth to support the new DEPI session.

If a reconfiguration changes the VLAN assignments in the M-CMTS Core 14, the M-CMTS Core can issue an L2TP Setup Link Information (SLI) command with the updated VLAN ID information. The VLANs may be assigned such that each VLAN ID has only one end point at the M-CMTS Core 14 and only one end point at the EQAM device 22. A physical egress port on a M-CMTS Core 14 may have more than one VLAN ID assigned to it. A physical DEPI ingress port 36 on the EQAM device 22 may have more than one assigned VLAN ID.

DEPI VLAN Assigned ID

An assigned AVP may be used for response message 54 (FIG. 2) sent by the EQAM 22 during a L2TP Incoming Call Reply message (ICRP) in response to a valid DEPI VLAN available ID AVP sent during the L2TP ICRQ from the M-CMTS Core 14. The list of VLAN IDs from the M-CMTS Core 14 in the DEPI VLAN available ID AVP can be invalid. Alternatively, the VLAN available ID AVP may be valid, but none of the VLANs specified have sufficient bandwidth at the ingress port 36 of the EQAM 22 to admit an additional session. In either case, the EQAM 22 may return the appropriate error code message. Otherwise, the EQAM device 22 selects one of the VLAN IDs from the DEPI VLAN Available IDs AVP and returns it in the DEPI VLAN Assigned ID AVP in an ICRP message. If a configuration change occurs pertaining to the VLAN assignment at the EQAM 22, the EQAM 22 issues an SLI command with the updated VLAN ID information.

Generic Layer-2 and Layer-3 Network Reservation

As described above, a mixture of L3 signaling and L2 resource tags can be used to reserve network bandwidth on any multi-hop, multi-path, L2 and/or L3 network. This mixture of L3 and L2 concepts is somewhat unconventional, but achieves the goal of controlled network resource reservation and allocation within the scope of L3 protocols on a L2 network. By putting the choice of paths under the control of the two endpoints, the resource reservation allows the intervening network 18 to be fully booked with pseudowire traffic without the fear of lost packets due to errors in load balancing or forwarding algorithms.

Figure 6:
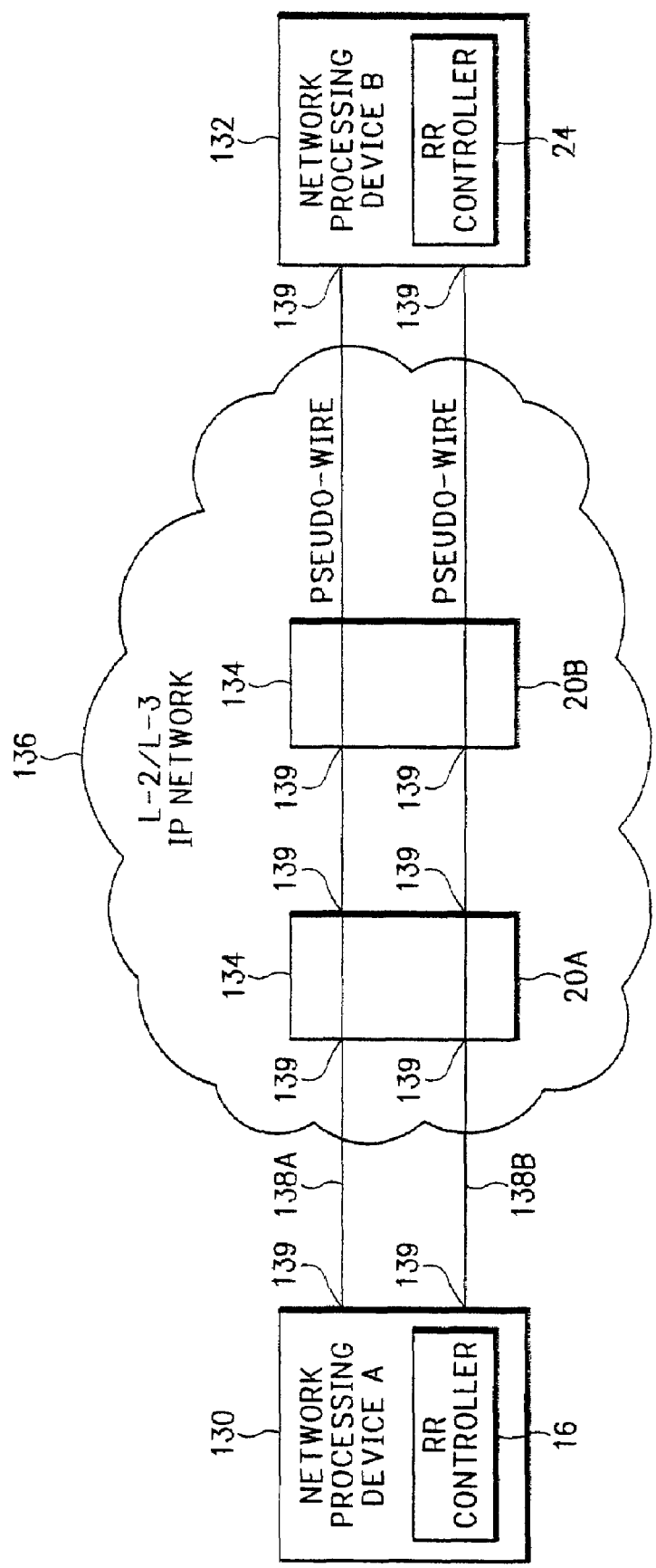
FIG. 6 is a block diagram showing how the resource reservation and admission control scheme can be used over an IP network for other non-cable applications.

FIG. 6 shows how this resource reservation scheme is extendable past the DOCSIS environment. The network processing devices 130 and 132 can be any endpoints or network processing elements that reserve layer-2 network resources by establishing pseudowires 138 over an IP network 136. The IP network 136 may all be part of the same subnet that contains one or more packet switching devices 130, 132, and 134 that may include multiple physical ports 139 on a common IP subnet. The scheme described above allows bandwidth to be reserved in this network on a per physical port basis.

In one embodiment, the pseudowires 138 are used for transporting Moving Picture Experts Group Transport Stream (MPEG-TS) video or any other type of layer-2 or layer-3 network traffic. The MPEG market currently uses dedicated GE links between a video server and an EQAM device. If that network grows and/or when that network converges with the DOCSIS CIN network, the resource reservation scheme can be re-applied from the DEPI protocol to the protocols used in the video environment. This may also be generally useful for providing an IntServ like environment for pseudowires across L2 networks.

Other types of network applications can also use the resource reservation scheme. For example, the network processing devices 130 and 132 may be gateways that need to reserve bandwidth for different audio or media streams either separately or in conjunction with a Resource Reservation Setup Protocol (RSVP).

Redundancy

Figure 7:
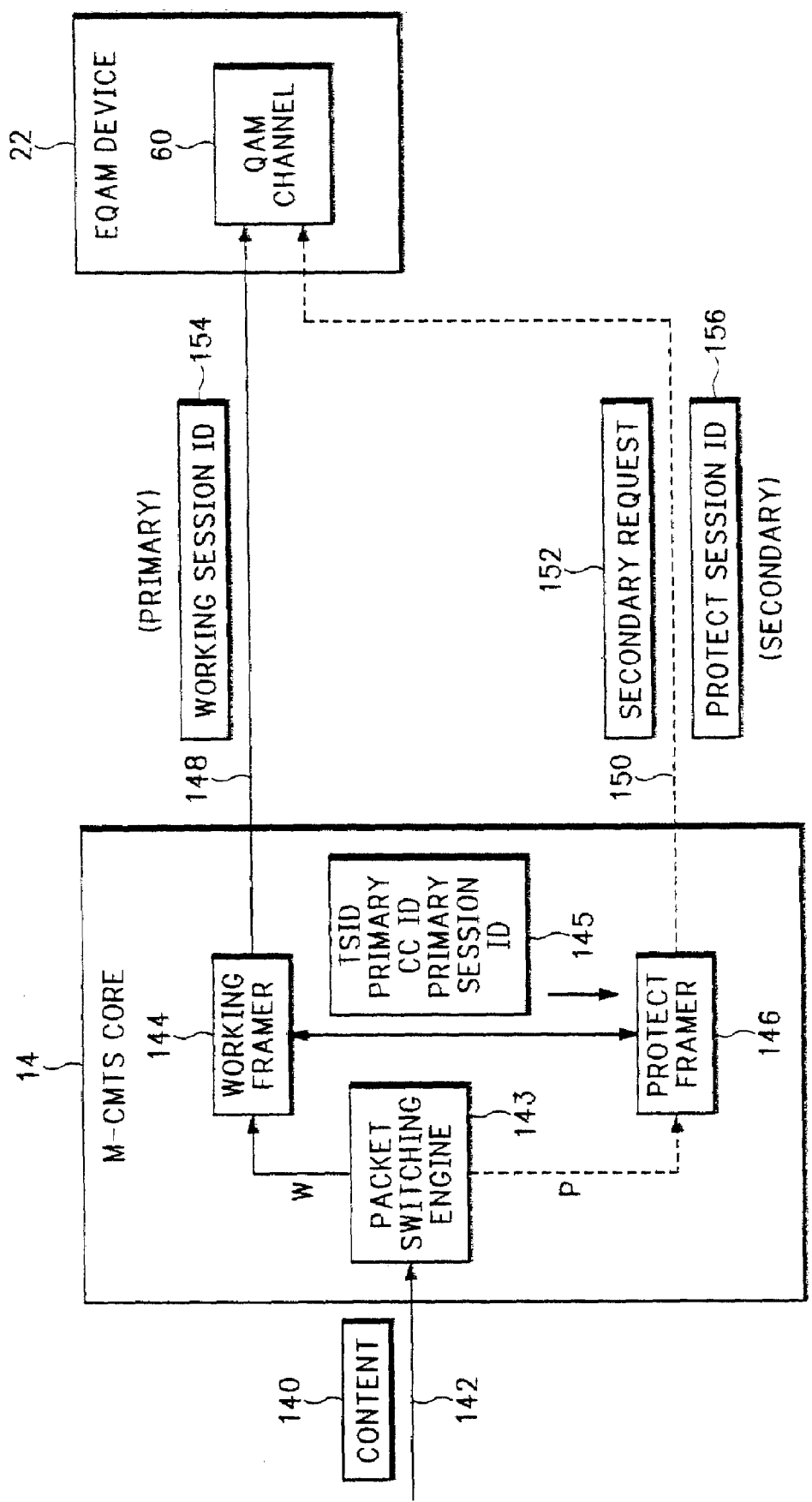
FIG. 7 is a diagram showing how the resource reservation and admission control scheme can be used to provide redundant communication sessions.

FIG. 7 shows yet another embodiment of the resource reservation scheme that may be used to provide redundancy in the Modular CMTS environment or other non-cable applications. FIG. 7 shows the M-CMTS Core 14 operating both a working MAC framer 144 and a protect MAC framer 146. The working framer 144 is alternatively referred to as the primary framer and the protect framer 146 is alternatively referred to as the secondary framer. The M-CMTS Core 14 includes a packet switching engine 143 that receives content 142 over a connection 140 connected to the WAN network 12 (FIG. 1). The packet switching engine 143 can forward the content 142 either to the working framer 144 or the protect framer 146.

The DEPI protocol currently allows only one session between one of the MAC framers and the QAM channel 60 in EQAM 22. For redundancy, a second protection session is needed. However, it is undesirable to delay initiating a new session until after a primary session fails.

Accordingly, a working (primary) session ID 148 and a protect (secondary) session ID 150 are established for a same DEPI session. The working framer 144 establishes the working DEPI session 148 in a conventional manner with the QAM channel 60. The working session 148 has an associated MPEG2 Transport Stream ID (TSID), primary Control Connection (CC) ID and primary session ID 154. If the M-CMTS Core 14 is configured for operating in the protection mode, then information 145 associated with the working DEPI session 148 is communicated to the secondary protect framer 146. For example, the TSID, primary CC ID, and primary session ID information 145 are communicated from working framer 144 to protect framer 146.

The protect framer 146 sends a message 152 to the QAM channel 60 requesting establishment of a secondary DEPI session 150. The request 152 identifies itself as a protect session for primary working session 148. The secondary request 152 may also include the TSID, primary CC ID, and primary session ID 154 for working session 148. The QAM channel 60 then verifies the working session information 145, and if authenticated, grants the secondary connection 150. Both the working MAC framer 144 and the protect MAC framer 146 can then establish pseudowires with the QAM channel 60.

The working DEPI session 148 continues to operate as normal until there is a disruption in working framer 144 or in the associated pseudowire connection. At that time, the packet switching engine 143 starts sending the content 142 to the protect framer 146. The packets carrying the content 142 are assigned the VLAN tag associated with the pseudowire negotiated with protect session 150.

Because the protect session 150 is already established, the protect framer 146 can send the packets containing content 142 directly to QAM channel 60 without having to initiate another DEPI session. The packets received over protect session 150 are processed in the same manner as packets previously received over primary session 148 and forwarded to the same cable modem via the HFC plant 26 (FIG. 1).

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A system, comprising:
 a gateway operating between a packet switched cable network and an access network, the gateway comprising:
  a processor to receive content for transporting using Data Over Cable System Interface Specification (DOCSIS) framing, over the packet switched cable network, and to an edge modulation device for remote modulation by the edge modulation device and downstream transmission from the edge modulation device;
  the processor configured to identify a first packet switched bandwidth amount for communicating the content from the gateway, over the packet switched cable network, to the edge modulation device, the processor further configured to identify a second Quadrature Amplitude Modulation (QAM) bandwidth amount for communicating the content from the edge modulation device, over a Radio Frequency (RF) channel, to a cable modem;
  the processor configured to filter available gateway ports according to the first packet switched bandwidth amount;
  the processor configured to identify Virtual Local Area Network (VLAN) tags corresponding to the filtered available gateway ports; and
  the processor configured to communicate the second QAM bandwidth amount and the VLAN tags over the packet switched cable network and to the edge modulation device;
 wherein the edge modulation device of the system is configured to:
  identify a subset of ports on the edge modulation device associated with the VLAN tags, each of the identified edge modulation device ports associated with a QAM channel;
  filter the identified subset of ports by comparing the second QAM bandwidth amount to availability of the associated QAM channels;
  select an edge modulation device port from the identified subset of ports according to said filtering; and
  send back a message to the gateway identifying a tag that corresponds to the selected edge modulation device port;
 wherein the gateway ports are associated with a VLAN and the processor sends a list of the VLAN tags to the edge modulation device and then receives back a selected one of the VLAN tags.

2. The system according to claim 1, wherein a pseudowire is established between endpoints, wherein the endpoints control reservation of resources for the pseudowire through distributing port selection.

3. The system according to claim 2, wherein the resource reservation is controlled by pseudowire endpoints and occurs according to a distributed selection process whereby a first pseudowire endpoint performs initial edge modulation device port filtering through filtering which of the gateway ports can be reserved and a second pseudowire endpoint performs subsequent edge modulation device port filtering based on an analysis of initial gateway port filtering information and bandwidth information transferred from the first pseudowire endpoint to the second pseudowire endpoint.

4. The system according to claim 1, including:
 a first framer to negotiate a first VLAN tag for establishing a first pseudowire connection for carrying the content between the gateway and the edge modulation device over the packet switched cable network; and
 a second framer to negotiate a second VLAN tag with the edge modulation device for establishing a second backup pseudowire connection for carrying the content between the gateway and the edge modulation device over the packet switched cable network if the first pseudowire connection fails.

5. An M-CMTS core, comprising:
 a processor to receive content to be Data Over Cable System Interface Specification (DOCSIS) framed and timestamped by the M-CMTS core, sent over a packet switched portion of a cable network to an Edge Quadrature Amplitude Modulation (EQAM), processed by the EQAM including timestamp adjustment and modulation, and then sent over a subset of QAM channels extending from the EQAM to subscriber devices;

the processor configured to identify a bandwidth amount required for transferring the content in the DOCSIS frames over the packet switched portion of the cable network;

the processor configured to filter available local ports according to the bandwidth amount;

the processor configured to identify tunnel identifier tags corresponding to the filtered local ports, to transmit a list indicating the identified tunnel identifier tags;

the processor configured to communicate both the bandwidth amount and the list over the packet switched portion of the cable network and to the EQAM, the list of identified tunnel identifier tags to be used by the remote EQAM for identifying an initial subset of remote ports on the EQAM;

the processor configured to receive, over the packet switched portion of the cable network, a communication from the EQAM, the communication identifying a subsequently identified subset of remote ports on the EQAM, the subsequently identified subset obtained by the EQAM comparing the bandwidth amount to ports included in the initially identified subset; and the processor configured to establish a pseudowire for transporting the content over the packet switched portion of the cable network, the pseudowire established between a filtered one of the local ports and one of the remote ports included in the subsequently identified subset, wherein the establishment of the psuedowire between the ports controls which of the QAM channels is used by the EQAM for forwarding the content to a cable modem.

6. The M-CMTS core according to claim 5, wherein the processor sends a connect speed requirement for the communication session to the EQAM and responsively receives back a selection of one of the tags from the list having an associated link with sufficient bandwidth for the required connect speed.

7. The M-CMTS core according to claim 6, wherein the processor sends the list of tags and the connect speed during initiation of a Downstream External PHY Interface (DEPI) session.

8. The M-CMTS core according to claim 5, wherein the processor generates a first list of tags for establishing a first pseudowire connection with the EQAM for conducting the communication session and generates a second list of tags for establishing a second pseudowire connection for conducting the communication session with the EQAM if the first pseudowire connection fails.

9. A method for reserving resources on a network, comprising:

negotiating with a Modular Cable Modem Termination System (M-CMTS) core using an Edge Quadrature Amplitude Modulation (EQAM) for reserving bandwidth for a communication session;

identifying a layer-2 identifier during the negotiation associated with a physical link that has bandwidth available for supporting the communication session;

receiving a list of Virtual Local Area Network (VLAN) tags that are associated with GE ports on the M-CMTS core that have available bandwidth for conducting the communication session;

selecting one of the VLAN tags from the list that also corresponds with a local GE port that has sufficient bandwidth for conducting the communication session, said selection identifying a VLAN tag that is associated with a QAM channel having sufficient bandwidth for conducting the communication session;

sending the selected VLAN tag back to the M-CMTS core;

establishing a virtual connection with the M-CMTS core using the selected VLAN tag, the virtual connection established over a GE network using the identified layer 2 identifier; and conducting the communication session over the virtual connection.

10. The method according to claim 9, including:

receiving the VLAN tags during initiation of a Downstream External PHY Interface (DEPI) session;

selecting one of the VLAN tags and sending the selected VLAN tag back to the M-CMTS core;

using the selected VLAN tag to establish the virtual connection over the GE network between the M-CMTS core and the QAM channel; and conducting the DEPI session over the virtual connection.

11. A system, comprising:

means for negotiating with a Modular Cable Modem Termination System (M-CMTS) core using an EQAM for reserving bandwidth for a communication session;

means for identifying a layer-2 identifier during the negotiation associated with a physical link that has bandwidth available for supporting the communication session;

means for receiving a list of Virtual Local Area Network (VLAN) tags that are associated with GE ports on the M-CMTS core that have available bandwidth for conducting the communication session;

means for selecting one of the VLAN tags from the list that also corresponds with a local GE port that has sufficient bandwidth for conducting the communication session, said selection means including means for identifying a VLAN tag that is associated with a Quadrature Amplitude Modulation (QAM) channel having sufficient bandwidth for conducting the communication session;

means for sending the selected VLAN tag back to the M-CMTS core;

means for establishing a virtual connection with the M-CMTS core using the selected VLAN tag, the virtual connection established over a GE network using the identified layer 2 identifier; and means for conducting the communication session over the virtual connection.

12. The system of claim 1, wherein the edge modulation device is configured to:

filter the sent list of VLAN tags to identify only a subset of the VLAN tags from the list; and send back a response to the gateway after receiving the list of VLAN tags from the gateway, wherein the response includes only the identified subset of VLAN tags, wherein the response does not include the VLAN tags from the list that were filtered by the edge modulation device.

13. The system of claim 12, wherein the gateway is configured to establish a logical connection to the edge modulation device based on which one of the VLAN tags was included in the response from the edge modulation device.

* * * * *

UNITED STATES PATENT AND TRADEMARK OFFICE
CERTIFICATE OF CORRECTION

| | | |
|---|---|---|
| PATENT NO. | : 7,701,951 B2 | Page 1 of 1 |
| APPLICATION NO. | : 11/370141 | |
| DATED | : April 20, 2010 | |
| INVENTOR(S) | : Chapman et al. | |

It is certified that error appears in the above-identified patent and that said Letters Patent is hereby corrected as shown below:

At column 11, line 30, please replace "psuedowire" with --pseudowire--.

Signed and Sealed this
Second Day of August, 2011

David J. Kappos
*Director of the United States Patent and Trademark Office*